United States Patent Office 3,507,792
Patented Apr. 21, 1970

3,507,792
BIODEGRADABLE, WATER-DISPERSIBLE
LUBRICANT COMPOSITIONS
Charles L. Zuraw, Harvey, Ill., assignor to Sinclair Research, Inc., New York, N.Y., a corporation of Delaware
No Drawing. Filed Nov. 30, 1967, Ser. No. 686,803
Int. Cl. C10m 1/06, 1/32, 1/26
U.S. Cl. 252—49.5   11 Claims

ABSTRACT OF THE DISCLOSURE

A lubricating composition which is essentially biodegradable and dispersible in water and made from about 0.5 to 30 wt. percent of an unsaturated ester of a normal aliphatic monocarboxylic acid and a normal aliphatic alcohol; about 0.1 to 30 wt. percent of at least one non-ionic emulsifier having an HLB range of about 8–15 which can be a condensate of ethylene oxide with an ester of a normal aliphatic monocarboxylic acid and a polyhydric normal alcohol the condensate containing about 2 to 20 moles of ethylene oxide per mole of condensate, a condensate of an ethylene oxide with a normal aliphatic alcohol the condensate containing about 1 to 15 moles of ethylene oxide per mole of condensate, a condensate of ethylene oxide with a normal aliphatic monocarboxylic acid the condensate containing about 2 to 20 moles of ethylene oxide per mole condensate; and about 1 to 99 wt. percent of water.

---

This invention relates to improved water-containing fluid compositions that are biodegradable. More particularly, this invention pertains to novel water-containing lubricants and coolants having improved properties and which contain components that are essentially completely degradable by microorganisms common to waste-treatment systems.

Lubricants and coolants in industrial use today for a variety of operations, such as cutting, extruding, machining and forming metals, glass, etc., often called soluble or emulsifiable oils, generally contain a petroleum oil base compounded with emulsifiers and coupling agents to effect stable emulsions when mixed with large amounts of water. In fact, the quality of good emulsion stability has created disposal problems of the used emulsions especially in industries where large volumes of the oils are employed. The problem is especially acute in the glass industry, for example, where soluble oil emulsions are used to lubricate shears and troughs of glass manufacturing equipment at highly dilute concentrations, and the emulsions are used in a single application only, and may not be recirculated as is common in other industries. Glass plants customarily have disposed of their used emulsion effluents by running them directly into natural streams. Recent legislation and public interest in pollution abatement will make it necessary, if plants continue to use conventional petroleum-base soluble oils, to employ expensive and impractical processes of breaking the emulsions with acids or salts to remove the oil before depositing the effluents in the streams. Alternately, the effluents can be economically deposited into sanitary sewers. However, it was found that conventional soluble oil emulsions containing petroleum oil and other nonbiodegradable substances caused the activated sludge of the sewage disposal plant to be made inactive.

Fluid compositions have been found which are suitable for use as aqueous dispersions in various types of industrial processing and metal working applications and which in essence are completely biodegradable and can be economically disposed of after use by direct transferral to a waste-treatment system. Often, however, when such compositions are used in an industrial operation which requires that the composition be dispersed in relatively large amounts of water, for instance, in glass lubricating operations wherein one part of the composition may be employed as a dispersion in about 100 to 300 parts or more of water, hard water soaps or curds may be formed which may clog spray nozzles frequently employed in the distribution of the aqueous dispersions.

I have now found a fluid composition which is in essence completely biodegradable and can be used in various industrial applications which require that the composition be employed as a dispersion in large amounts of water without encountering the formation of appreciable amounts of hard water soaps or curds. According to the invention, the fluid composition is made from about 0.5 to 30, preferably about 15 to 25, wt. percent of an unsaturated ester of a normal aliphatic monocarboxylic acid and a normal aliphatic alcohol; about 0.1 to 30, preferably about 5 to 12, wt. percent of one or more nonionic emulsifiers which can be a condensate of ethylene oxide with an ester of a normal aliphatic monocarboxylic acid and a polyhydric normal alcohol, a condensate of ethylene oxide with a normal aliphatic alcohol, a condensate of ethylene oxide with a normal aliphatic monocarboxylic acid; and about 1 to 99, preferably about 30 to 50, wt. percent of water. The exact proportions of each component may vary depending upon the particular machinery operation of industrial process in which the composition is employed.

The unsaturated ester compound used in the composition of the present invention is an ester of a normal aliphatic hydrocarbyl monocarboxylic acid having about 8 to 30 carbon atoms and an alcohol which can be a normal aliphatic hydrocarbyl alcohol having up to about 30 carbon atoms, i.e., monohydric or polyhydric, e.g., having up to about 4 hydroxyl groups or more and preferably at least about 5 carbon atoms. The normal aliphatic monocarboxylic acids which are suitable for preparing the ester component of the composition of the invention include saturated fatty acids such as lauric, myristic, palmitic, pelargonic, stearic, and behenic, cerotic, etc. acids, as well as olefinically-unsaturated fatty acids such as oleic, linoleic, linolenic, ricinoleic, etc. acids. The normal monohydric alcohols which are suitable for preparing the ester component of the composition of the invention include saturated fatty alcohols such as lauryl, myristyl, palmityl, pelargonyl, stearyl, behenyl, and cerotyl alcohols as well as olefinically-unsaturated fatty alcohols such as oleyl, linoleyl, linolenyl, ricinoleyl, etc. alcohols. The normal polyhydric alcohols which are suitable for preparing the ester component of the composition of the invention include adonitol, arabitol, pentaerythritol, iditol, galactitol, mannitol, sorbitol, talitol and xylitol. At least one of the acid and alcohol portions of the ester is olefinically unsaturated. These ester components are often available in admixture with saturated esters. Preferably, the unsaturated ester component is a monoester. The term "normal" is used in designating the unsaturated ester and emulsifiers of the composition of this invention refers to components having a straight or in-line carbon-to-carbon chain.

Preferred esters are those found in sperm oil, particularly 45° N.W. sperm oil which is the clear liquid grade sperm oil decanted at about 45° F. during natural winter exposure. The ester component of the composition of the invention can be supplied by using this oil. Other suitable esters are oleyl oleate, glycerol monooleates and other naturally-occurring esters as well as synthesized esters.

The emulsifier component of the composition of the present invention can be one or more of the following nonionic emulsifiers: a condensate of ethylene oxide with an ester of a normal aliphatic hydrocarbyl monocarboxylic acid having about 8 to 30 carbon atoms and a polyhydric normal hydrocarbyl alcohol having about 2 to 8 carbon atoms, the condensate containing about 2 to 20 moles of ethylene oxide per mole of condensate; a condensate of ethylene oxide with a normal aliphatic hydrocarbyl alcohol having about 8 to 30 carbon atoms, the condensate containing about 1 to 15 moles of ethylene oxide per mole of condensate; and a condensate of ethylene oxide with a normal aliphatic hydrocarbyl monocarboxylic acid having about 8 to 30 carbon atoms, the condensate containing about 2 to 20 moles of ethylene oxide per mole of condensate.

The previously named normal aliphatic monocarboxylic acids and normal aliphatic alcohols are suitable for use in preparing the above emulsifier components of the composition of the present invention. Especially suitable polyhydric normal alcohols which can be used in preparing the condensate of ethylene oxide with an ester which preferably is a monoester of a normal aliphatic monocarboxylic acid and a polyhydric normal alcohol include mannitol, sorbitol, and sorbitan. One or more of the above emulsifiers are used in the composition of the invention. Suitable emulsifiers include polyoxyethylene sorbitan monopalmitate, polyoxyethylene sorbitan trioleate, polyoxyethylene oleyl ether, polyoxethlene (10 mol) oleyl ether, polyoxyethlene monostearate, and polyoxyethylene monooleate.

The property of hydrophile-lipophile balance (HLB) is an empirical number assigned to emulsifiers to represent the relative oil or water affinity of the material. An emulsifier having a hydrophile-lipophile balance (HLB) of about 2 to 9 is classifiable as lipophilic (oil-loving). An emulsifier having a hydrophile-lipophile balance (HLB) of about 15–18 is designated as hydrophilic (water-loving). The total nonionic emulsifier component of the present invention is in a HLB range of about 8–15, preferably about 10–14. Thus if more than one non-ionic emulsifiers are used, they should be used in such proportions to give an HLB within the desired range.

An amine may be added to the composition of the invention in the amount of about 0.1 to 20, preferably about 7 to 13, weight percent as a corrosion or rust inhibitor. In general, amines having the following structural formula may be used as the amine additive to the composition of the invention:

$$R_mNH_n$$

wherein R is a straight chain alkyl or hydroxyalkyl group of about 2 to 12, preferably about 2 to 4, carbon atoms, $m$ is 1 to 3 and $n$ is 0 to 2. Some examples of the amines that may be used in the composition of the invention include monomethanolamine, monoethaolamine, monobutanolamine, diethanolamine, triethanolamine, methylamine, ethylamine and n-propylamine.

It may be desirable to add to the composition of the invention a normal hydrocarbyl alcohol in the amount of about 5 to 50, preferably about 15 to 30, wt. percent to prevent freezing. Suitable alcohols, including glycols and glycol ethers, are water-soluble in the amounts used and may often contain 1 to about 25 carbon atoms. Some examples of alcohols that may be used in the composition of the invention include alkanols, such as methanol, ethanol, n-propanol, n-butanol, sec-butanol, etc.; glycols, such as ethylene glycol, propylene glycol, 1,3-propanediol, 1,2-butanediol, 2,3-butanediol, 1,4-butanediol, pinacol, etc.; polyols, such as glycerol, pentaerythritol, sorbitol, etc.; alkoxyalcohols, for example, the hydroxy ethers, such as, methoxymethanol, 1-methoxyethanol, 2-methoxyethanol, 1-ethoxyethanol, 2-ethoxyethanol, 2-ethoxypropanol, 2-ethoxybutanol, diethylene glycol, triethylene glycol, etc.; polyether glycols, e.g. polyethylene glycols, of up to about 750 or more molecular weight; and like compounds.

It may also be desirable to add to the composition a small amount, say about 0.1 to 10 percent by weight, of other ingredients such as antifoam agents, antiwear additives, preservatives, anti-gelling agents, metal deactivators, etc. If such additives be incorporated, they should be biodegradable, especially in a sanitary sewage treating system. A suitable metal deactivator is benzotriazole or a triethanol amine salt of a hydrocarbon-sulfamido acetic acid, e.g. $CH_3(CH_2)_{11-17}SO_2NHCH_2COONa$, which can be used in an amount of about 0.1 to 10 wt. percent. High molecular weight normal alcohols, e.g. n-hexadecyl alcohol, are suitable antifoaming agents. The antifoam agent can be used in a minor, effective amount, e.g., about 0.01 to 5 wt. percent.

In use as water dispersed lubricants or coolants the compositions of this invention may be dispersed in the desired amount of water, often about 5 to 400 or more parts of water, depending upon the particular application contemplated. The composition of the invention is especially useful for lubricating solid, e.g. metal, surfaces in contact with molten glass by providing a lubricating amount of an aqueous dispersion of the composition between the surface and the glass. For example, in use as a glass working fluid one part of the lubricant composition for approximately each 100 to 400 parts of water, preferably for approximately each 300 parts of water, may be used to obtain satisfactory results.

In preparing the composition of the invention, conventional emulsification methods can be employed. The invention is specifically illustrated by the following example.

EXAMPLE 1

A batch of the fluid composition of the invention had the listed components and was prepared in the following manner.

| Component: | Wt. percent |
| --- | --- |
| 45° N.W. sperm oil | 25.0 |
| Polyoxyethylene (20 mole) sorbitan monopalmitate | [1] 2.8 |
| Polyoxyethylene (20 mole) sorbitan trioleate | [1] 2.1 |
| Polyoxyethylene (6 mole) oleyl ether | [1] 2.1 |
| Monoethanolamine | 5.0 |
| Benzotriazole | 0.5 |
| Ethylene glycol | 25.0 |
| Water | 37.5 |
| | 100.0 |

[1] 12.5 HLB.

The benzotriazole was dissolved in the three polyoxyethylene-containing emulsifiers. One-fifth of the sperm oil was added to the emulsifiers and the mixture was stirred for about ½ to 1 hour. The monoethanolamine was then added and the resulting mixture was stirred for about ½ to 1 hour. About one seventh of the water was added and the resulting mixture was stirred for about ½ to 1 hour. The remainder of the sperm oil and the water was then added and the resulting mixture was stirred for about 1½ hours. Finally, the ethylene glycol was added and the composition was stirred to a uniform consistency.

EXAMPLE 2

A batch of the fluid composition of the invention was prepared in the same manner as in Example 1 (there being one polyoxyethylene emulsifier instead of three) and had the following composition.

| Component: | Wt. percent |
| --- | --- |
| 45° N.W. sperm oil | 25.0 |
| Brij 96 (polyoxyethylene (10 mole) oleylether) | [1] 8.0 |
| AT666 (triethanol amine salt of a hydrocarbon sulfamido acetic acid) | 2.0 |
| Monoethanolamine | 7.5 |
| Ethylene glycol | 18.0 |
| Water | 39.5 |
| | 100.0 |

[1] 12.4 HLB.

EXAMPLE 3

The fluid composition prepared in Example 1 was subjected to a biodegradability test, using a simulated activated sludge system. A 14-liter New Brunswick Micro-Ferm fermentor was used to simulate an activated sludge sewage treatment system. Activated sludge and raw sewage were obtained from a local disposal plant. The synthetic sewage used in all tests was prepared as follows:

Synthetic sewage: [1]
    Bacto peptone—3.5 gm.
    NaCl—3.0 gm.
    $K_2HPO_4$—0.5 gm.
    $MgSO_4 \cdot 7H_2O$—0.2 gm.
    Raw sewage—1 liter
    Deionized water—11 liters

[1] Huddleston, R. L. and Allred, R. C.—"Evaluation of Detergent Degradation Using Activated Sludge." J. Am. Oil Chemists, 41 (11) 732–735, November 1964.

Ten liters of synthetic sewage containing between 2000 to 3000 mg./liter (dry weight) activated sludge as recommended for normal sewage plant operation were added to the fermentor. The temperature was held at 25° C. and the air flow controlled at approximately one liter per minute. Slight mixing (100 r.p.m.) was used to keep the sludge in suspension during operation. Retention time in the system was limited to six hours. At the end of this period, air flow and mixing were discontinued and the sludge allowed to settle. The clear water was siphoned off and fresh synthetic sewage added. Approximately 1.5 liters of sludge remained in the fermentor after the clear effluent was removed. Samples were collected initially, at three and at six hours. Chemical and Biochemical Oxygen Demand determinations were made on clear supernate from each sample, employing the procedures outlined in "Standard Methods for the Examination of Water and Wastewater," American Public Health Association, Inc., 1965.

Three such runs were made. The first and third runs were made without the addition of the novel fluid composition of this invention in order to obtain information on sludge activity.

Results presented in Table I demonstrate the complete degradation of the fluid composition as indicated by COD and BOD (Chemical and Biochemical Oxygen Demand) determinations. These procedures are routinely used by disposal plant operators to determine the quality of their effluent. Runs 1 and 3 demonstrate the effectiveness of the system in handling synthetic sewage. The fluid composition added to the system in run 2 increased the initial COD and BOD, but after six hours exposure the levels had been reduced to close to that of runs 1 and 3. The Chemical and Biochemical Oxygen Demand determinations obtained therefore indicate that the fluid composition was degraded with no apparent adverse effect on the activated sludge.

The fluid composition prepared above was subjected to rust and wear tests. For comparison, a soluble oil composition containing petroleum oil which is representative of the fluids often used in industry was subjected to the identical tests. The results listed in Table II demonstrate the superiority of the fluid composition of the present invention in inhibiting rust and wear.

TABLE II

| Product | Dilution | Cast iron chip rust test[1] | Shell four ball wear test (scar diameter mm.)[2] |
|---|---|---|---|
| Fluid composition | 1:50 | No rust | 0.47 |
|  | 1:150 | do | 0.50 |
|  | 1:300 | Very light rust | 0.47 |
| Soluble oil | 1:50 | Rust | 0.65 |
|  | 1:150 | do | 0.63 |
|  | 1:300 | do | 0.70 |

[1] This is a standard test often used for testing rust inhibiting properties of soluble oil emulsions. It consists of immersing cast iron chips in test emulsion in a beaker; covering with a watch glass; inverting and allowing emulsion to drain while chips remain covered on the watch glass by the beaker. Chips are observed for rust after 24 hours.
[2] Test conditions: 1,800 r.p.m., 5 kg., 1 hour, at 130° F.

It is claimed:
1. A water-dispersible, biodegradable fluid composition consisting essentially of about 0.5 to 30 weight percent of oleyl oleate; about 0.1 to 30 weight percent of nonionic emulsifier having a HLB range of about 8 to 15 and consisting essentially of at least one nonionic emulsifier selected from the group consisting of a condensate of ethylene oxide with an ester of oleic acid and a polyhydric normal hydrocarbyl alcohol having about 2 to 8 carbon atoms, the condensate containing about 2 to 20 moles of ethylene oxide per mole of condensate, a condensate of ethylene oxide with oleyl alcohol, the condensate containing about 1 to 15 moles of ethylene oxide per mole of condensate, and a condensate of ethylene oxide with oleic acid, the condensate containing about 2 to 20 moles of ethylene oxide per mole of condensate; and about 1 to 99 weight percent of water.

2. The composition of claim 1 wherein the oleyl oleate is provided by sperm oil.

3. The composition of claim 2 wherein the nonionic emulsifier having a HLB range of about 8 to 15 has at least one nonionic emulsifier selected from the group consisting of polyoxyethylene sorbitan trioleate and polyoxyethylene oleyl ether.

4. The composition of claim 3 to which is added about 5 to 50 wt. percent of a water-soluble normal hydrocarbyl alcohol.

5. The composition of claim 4 wherein the alcohol is ethylene glycol.

6. The composition of claim 5 to which is added about 0.1 to 10 wt. percent benzotriazole.

7. The composition of claim 6 to which is added about 0.1 to 20 wt. percent of an amine.

8. The composition of claim 7 wherein the amine is monoethanolamine.

TABLE I.—DISPOSAL OF THE FLUID COMPOSITION IN A SIMULATED ACTIVATED SLUDGE SYSTEM

|  | Chemical, Oxygen Demand (COD), p.p.m.[1] | | | Five-day Biochemical Oxygen Demand (BOD), p.p.m.[2] | | |
|---|---|---|---|---|---|---|
| Exposure Time (Hours) | 0 | 3 | 6 | 0 | 3 | 6 |
| Run Number: | | | | | | |
| 1. No fluid composition | 197 | 96 | 48 | 108 | 70 | 33 |
| 2. Fluid composition added [3] | 426 | 161 | 60 | 300 | 27 | 3 |
| 3. No fluid composition | 211 | 47 | 40 | 65 | 13 | 5 |

[1] Chemical Oxygen Demand is the amount of dichromate oxidizable material in a water or sewage sample. It is reported as mg./liter (p.p.m.) of dichromate oxygen utilized.
[2] Biochemical Oxygen Demand is an estimate of the quantity of oxygen required by bacteria (during a five-day incubation period) to oxidize, or render stable, the more easily decomposable organic substances in a water or sewage sample. It is reported as mg./liter (p.p.m.) of oxygen utilized.
[3] 3.3 percent solution in tap water.

9. The composition of claim 1 wherein the oleyl oleate is present in an amount of about 15 to 25 wt. percent; the nonionic emulsifier is present in an amount of about 5 to 12 wt. percent; and water is present in an amount of about 30 to 50 wt. percent.

10. A water-dispersible, biodegradable fluid composition of about 15 to 25 wt. percent of sperm oil; about 5 to 12 wt. percent of a nonionic emulsifier having a HLB range of about 10–14 and comprising polyoxyethylene sorbitan monopalmitate, polyoxyethylene sorbitan trioleate, and polyoxyethylene oleyl ether; about 15 to 30 wt. percent ethylene glycol; about 0.1 to 10 wt. percent of benzotriazole; about 7 to 13 wt. percent of monoethanolamine; and about 30 to 50 wt. percent of water.

11. A water-dispersible, biodegradable fluid composition of about 15 to 25 wt. percent of sperm oil; about 5 to 12 wt. percent of a polyoxyethylene oleyl ether containing about 10 moles of ethylene oxide and having a HLB range of 10–14; about 15 to 30 wt. percent ethylene glycol; about 7 to 13 wt. percent of monoethanolamine; and about 30 to 50 wt. percent of water.

References Cited

UNITED STATES PATENTS

| | | | |
|---|---|---|---|
| 3,043,783 | 7/1962 | Hatcher et al. | 252—51.5 X |
| 3,117,929 | 1/1964 | McCoy et al. | 252—49.5 X |
| 3,205,172 | 9/1965 | Benton | 252—49.5 |
| 3,252,907 | 5/1966 | Kharouf et al. | 252—49.5 X |
| 3,255,108 | 6/1966 | Wiese | 252—49.5 X |
| 3,280,027 | 10/1966 | St. Pierre et al. | 252—49.5 X |

FOREIGN PATENTS

| | | |
|---|---|---|
| 849,126 | 9/1960 | Great Britain. |
| 899,395 | 6/1962 | Great Britain. |
| 986,068 | 3/1965 | Great Britain. |
| 643,663 | 6/1962 | Canada. |

DANIEL E. WYMAN, Primary Examiner

W. J. SHINE, Assistant Examiner

U.S. Cl. X.R.

252—51.5, 56